United States Patent
Yang et al.

(10) Patent No.: US 12,020,663 B2
(45) Date of Patent: Jun. 25, 2024

(54) DISPLAY PANEL, DISPLAY MODULE, AND DISPLAY DEVICE

(71) Applicant: HKC CORPORATION LIMITED, Shenzhen (CN)

(72) Inventors: Yanna Yang, Guangdong (CN); Haoxuan Zheng, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/080,300

(22) Filed: Dec. 13, 2022

(65) Prior Publication Data
US 2023/0343302 A1  Oct. 26, 2023

(30) Foreign Application Priority Data
Apr. 20, 2022  (CN) .......................... 202210413397.1

(51) Int. Cl.
 *G09G 3/36* (2006.01)
 *G02F 1/13357* (2006.01)

(52) U.S. Cl.
 CPC ..... *G09G 3/3607* (2013.01); *G02F 1/133615* (2013.01); *G09G 3/3696* (2013.01); *G09G 2320/0233* (2013.01)

(58) Field of Classification Search
 CPC ............... G09G 3/3607; G09G 3/3696; G09G 2320/0233; G02F 1/13361
 See application file for complete search history.

(56) References Cited

U.S. PATENT DOCUMENTS

| | | | |
|---|---|---|---|
| 2004/0169807 A1* | 9/2004 | Rho | G09G 3/3648 349/139 |
| 2010/0182333 A1 | 7/2010 | Chiang | |
| 2013/0057598 A1 | 3/2013 | Iwamoto | |
| 2014/0111410 A1 | 4/2014 | Guo | |
| 2014/0118331 A1* | 5/2014 | Jeon | G09G 3/3614 345/99 |
| 2014/0210876 A1 | 7/2014 | Xie | |
| 2016/0131954 A1 | 5/2016 | Li et al. | |
| 2017/0018255 A1* | 1/2017 | Kim | G09G 3/20 |
| 2018/0053478 A1 | 2/2018 | Xu | |
| 2018/0108307 A1 | 4/2018 | Sakurai | |
| 2020/0105218 A1* | 4/2020 | Huang | G02F 1/13454 |
| 2020/0184895 A1 | 6/2020 | Zhao et al. | |
| 2021/0271142 A1 | 9/2021 | Chen et al. | |
| 2021/0356785 A1 | 11/2021 | Yuan et al. | |

FOREIGN PATENT DOCUMENTS

| | | |
|---|---|---|
| CN | 103065556 A | 4/2013 |
| CN | 103177691 A | 6/2013 |
| CN | 104238217 A | 12/2014 |

(Continued)

*Primary Examiner* — Kenneth B Lee, Jr.
(74) *Attorney, Agent, or Firm* — HAUPTMAN HAM, LLP

(57) ABSTRACT

A display panel, a display module, and a display device are provided. The display panel includes multiple pixel units arranged in an array. Each of the multiple pixel units includes sub-pixels emitting lights of three colors. Multiple sub-pixels are arranged in rows in a first direction, and sub-pixels emitting lights of a same color are arranged in columns. In any pixel unit of the array, the third-color sub-pixel has a charging rate higher than each of the first-color sub-pixel and the second-color sub-pixel.

3 Claims, 7 Drawing Sheets

(56) References Cited

FOREIGN PATENT DOCUMENTS

| | | |
|---|---|---|
| CN | 104460158 A | 3/2015 |
| CN | 107045858 A | 8/2017 |
| CN | 108459446 A | 8/2018 |
| CN | 108594554 A | 9/2018 |
| CN | 109658889 A | 4/2019 |
| CN | 110853595 A | 2/2020 |
| CN | 111812901 A | 10/2020 |
| CN | 112562573 A | 3/2021 |
| CN | 112951174 A | 6/2021 |
| CN | 113741107 A | 12/2021 |
| CN | 114167637 A | 3/2022 |
| CN | 114170986 A | 3/2022 |
| TW | 200823852 A | 6/2008 |
| WO | 2022032814 A1 | 2/2022 |

* cited by examiner

DISPLAY PANEL, DISPLAY MODULE, AND DISPLAY DEVICE

CROSS-REFERENCE TO RELATED APPLICATIONS

This application claims priority under 35 U.S.C. § 119(a) to Chinese Patent Application No. 202210413397.1, filed Apr. 20, 2022, the entire disclosure of which is incorporated herein by reference.

TECHNICAL FIELD

This disclosure relates to the field of display technology, and in particular to a display panel, a display module, and a display device.

BACKGROUND

At present, Liquid-Crystal-Display (LCD) panels are mainstream display devices in the market. A LCD includes many modes, such as a twisted nematic mode, an electronically controlled birefringence mode, a vertical alignment mode, etc. The vertical alignment mode is a common display mode with advantages of high contrast, wide viewing angle, no friction alignment, etc. However, since vertically rotating liquid crystal is adopted in the vertical alignment mode, a difference between birefringence of liquid crystal molecules is relatively large, resulting in a serious problem of color shift of the LCD panel under a large viewing angle. A yellowish picture displayed by the LCD panel is mainly due to different brightness of sub-pixels caused by various reasons during production.

SUMMARY

A display panel is provided in implementations of the present disclosure. The display panel includes multiple scan lines, multiple data lines, and multiple pixel units arranged in an array. The multiple scan lines are arranged in a first direction. The multiple data lines are arranged in a second direction. The second direction is perpendicular to the first direction. Each of the multiple pixel units includes a red sub-pixel, a green sub-pixel, and a blue sub-pixel. Multiple sub-pixels are arranged in rows in the first direction, and sub-pixels in each of the rows are coupled with one of the multiple scan lines to receive a scan signal. Sub-pixels which emit lights of a same color are arranged in columns in the second direction, and sub-pixels in each of the columns are coupled with at least one of the multiple data lines to receive image display data. In any pixel unit of the array, the blue sub-pixel has a charging rate higher than each of the red sub-pixel and the green sub-pixel.

A display module is further provided in implementations of the present disclosure. The display module includes a display panel and a backlight module. The display panel includes multiple scan lines, multiple data lines, and multiple pixel units arranged in an array. The multiple scan lines are arranged in a first direction. The multiple data lines are arranged in a second direction. The second direction is perpendicular to the first direction. Each of the multiple pixel units includes a red sub-pixel, a green sub-pixel, and a blue sub-pixel. Multiple sub-pixels are arranged in rows in the first direction, and sub-pixels in each of the rows are coupled with one of the multiple scan lines to receive a scan signal. Sub-pixels which emit lights of a same color are arranged in columns in the second direction, and sub-pixels in each of the columns are coupled with at least one of the multiple data lines to receive image display data. In any pixel unit of the array, the blue sub-pixel has a charging rate higher than each of the red sub-pixel and the green sub-pixel. The backlight module is configured to provide the display panel with a light for display. The display panel is configured to emit a corresponding light according to image data to-be-displayed to perform image display.

A display device is further provided in implementations of the present disclosure. The display device includes a display module, a support frame, and a power supply module. The display module includes a display panel and a backlight module. The display panel includes multiple scan lines, multiple data lines, and multiple pixel units arranged in an array. The multiple scan lines are arranged in a first direction. The multiple data lines are arranged in a second direction. The second direction is perpendicular to the first direction. Each of the multiple pixel units includes a red sub-pixel, a green sub-pixel, and a blue sub-pixel. Multiple sub-pixels are arranged in rows in the first direction, and sub-pixels in each of the rows are coupled with one of the multiple scan lines to receive a scan signal. Sub-pixels which emit lights of a same color are arranged in columns in the second direction, and sub-pixels in each of the columns are coupled with at least one of the multiple data lines to receive image display data. In any pixel unit of the array, the blue sub-pixel has a charging rate higher than each of the red sub-pixel and the green sub-pixel. The backlight module is configured to provide the display panel with a light for display. The display panel is configured to emit a corresponding light according to image data to-be-displayed to perform image display. The power module is configured to provide the display module for image display with a power voltage, and the display module and the power module are fixed to the support frame.

BRIEF DESCRIPTION OF THE DRAWINGS

In order to explain technical solutions in implementations of the present disclosure more clearly, the following will give a brief introduction to accompanying drawings which are needed to be used in description of implementations or the related art. Apparently, the accompanying drawings in the following description are some implementations of the present disclosure. For those skilled in the art, other accompanying drawings can be obtained according to these accompanying drawings without creative efforts.

DETAILED DESCRIPTION

Figure 1:
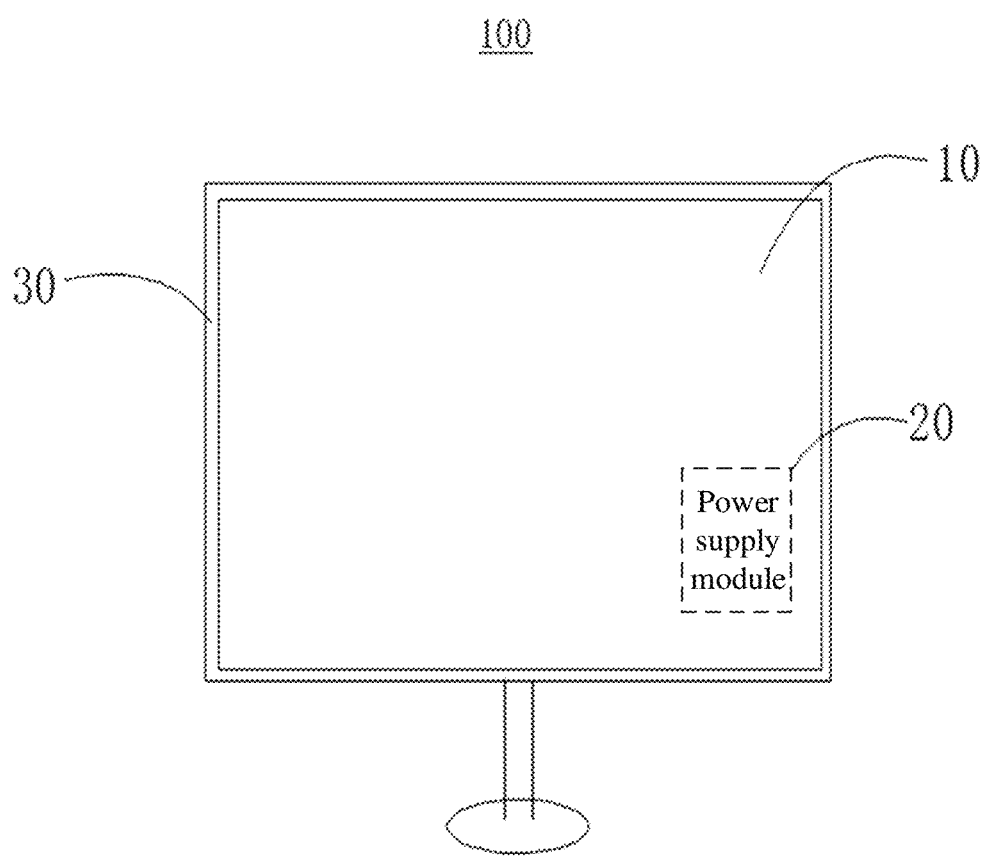
FIG. 1 is a schematic plane structural diagram of a display device in an implementation of the present disclosure.

In order to facilitate understanding of the present disclosure, a comprehensive description will be given below with reference to relevant accompanying drawings. The accompanying drawings illustrate some exemplary implementations of the present disclosure. However, the present disclosure can be implemented in many different forms and is not limited to implementations described herein. On the contrary, these implementations are provided for a more thorough and comprehensive understanding of the present disclosure.

The following implementations are described with reference to accompanying drawings to illustrate particular implementations in which the present disclosure may be implemented. The serial numbers assigned herein for the components themselves, such as "first", "second", etc., are only used to distinguish between objects described and do not have any sequential or technical meaning. The "connection" and "coupling" in the present disclosure, unless otherwise specified, include direct and indirect connection (coupling). Direction terms mentioned in the present disclosure, such as "up", "down", "front", "back", "left", "right", "inside", "outside", "side", etc., are only directions with reference to the directions of the accompanying drawings. Therefore, the direction terms are used for better and clearer illustration and understanding of the present disclosure, and are not intended to indicate or imply that the device or component must have a specific orientation, be constructed and operated in the particular orientation, and therefore cannot be construed as limiting to the present disclosure.

In the description of the present disclosure, it should be noted that unless otherwise expressly specified or defined, terms such as "disposed", "arranged", "provided with", "mount", "couple", and "connect" should be understood broadly, and for example, a fixed connection, or a detachable connection, or an integrated connection; may be a mechanical connection; and may be a direct connection, or an indirect connection via an intermediate medium, or may be an internal communication between two components. The specific meanings of the above-mentioned terms in the present disclosure could be understood by those of ordinary skill in the art according to specific situations. It should be noted that the terms "first", "second", etc. in the specification, claims and accompanying drawings of the present disclosure are used to distinguish different objects, rather than to describe a specific order.

In addition, terms "comprise", "may comprise", "include", or "may include" used in the present disclosure indicate the existence of corresponding functions, operations, components, etc., which are disclosed, and do not limit one or more other functions, operations, components, etc. Moreover, the terms "comprise" or "include" indicate the existence of corresponding features, numbers, steps, operations, elements, components, or combinations thereof disclosed in the specification, and do not exclude the existence or addition of one or more other features, numbers, steps, operations, elements, components, or combinations thereof, with the intent of covering non-exclusive inclusion. Furthermore, when describing implementations of the present disclosure, "may" is used to mean "one or more implementations of the present disclosure". Also, the term "exemplary" is intended to refer to examples or illustrations.

Unless otherwise defined, all technical and scientific terms used herein have the same meaning as commonly understood by those skilled in the art of the present disclosure. The terms used herein in the specification of the present disclosure are for the purpose of describing specific implementations only and are not intended to limit the present disclosure.

Reference can be made to FIG. 1, which is a schematic structural diagram of a display device 100 in an implementation of the present disclosure. The display device 100 includes a display module 10, a power module 20, and a support frame 30. The display module 10 and the power module 20 are fixed to the support frame 30. The power module 20 is disposed on a back surface of the display module 10, that is, a non-display surface of the display module 10. The power module 20 is configured to provide a power voltage for the display module 10 for image display. The support frame 30 can fix and protect the display module 10 and the power module 20.

Figure 2:
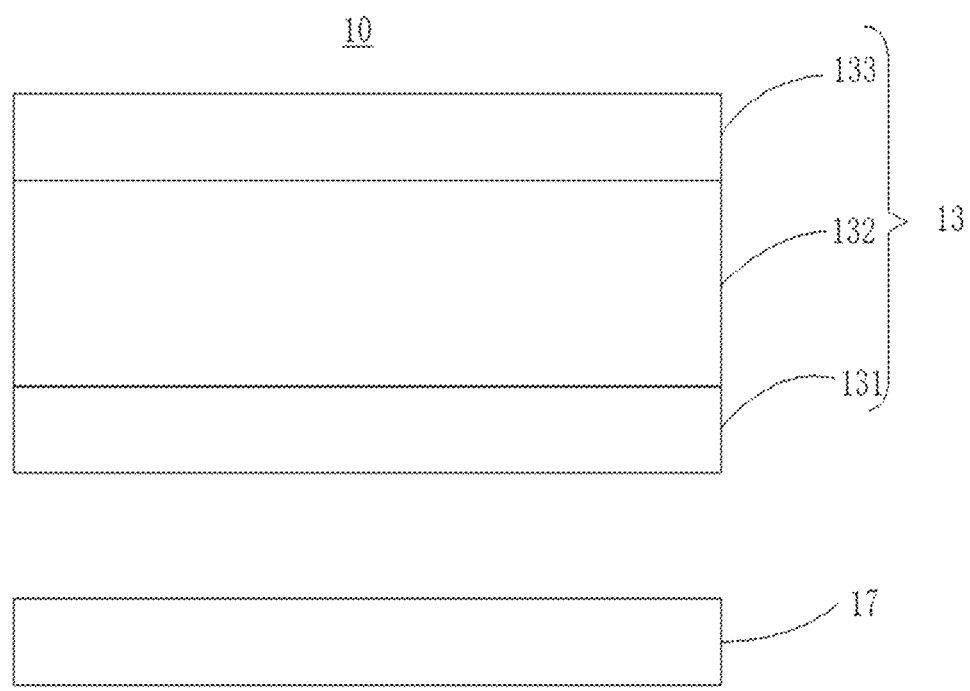
FIG. 2 is a schematic side structural diagram of a display module in FIG. 1.

Furthermore, reference can be made to FIG. 2, which is a schematic side structural diagram of the display module 10 in FIG. 1. As illustrated in FIG. 2, the display module 10 includes a display panel 13 and a backlight module (BM) 17. The BM 17 is configured to provide a light for display to the display panel 13. The display panel 13 is configured to emit a corresponding light according to an image data Data to-be-displayed to perform image display. The display module 10 further includes other components or assemblies, such as a power module, a signal processor module, a signal sensing module, etc.

The display panel 13 includes an Array Substrate (AS) 131, a Color Film (CF) substrate 133, and a liquid crystal layer 132 sandwiched between the AS 131 and the CF substrate 133. Driving elements disposed on the AS 131 and the CF substrate 133 are configured to generate a corresponding electric field according to the image data Data, thereby driving liquid crystal molecules in the liquid crystal layer 132 to deflect angles to emit lights of corresponding brightness to perform image display.

Figure 3:
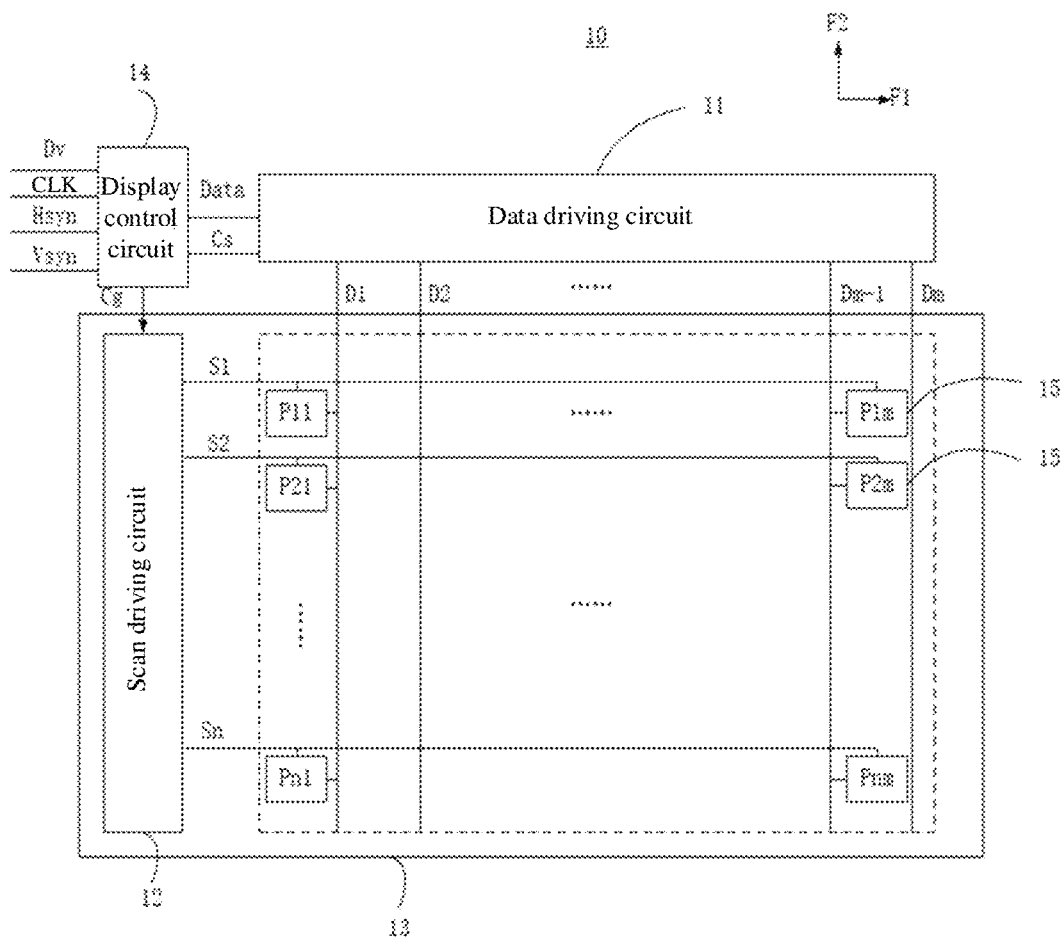
FIG. 3 is a schematic structural diagram of a plane layout of a display module in FIG. 1.

Reference can be made to FIG. 3, which is a schematic structural diagram of a plane layout of the display module 10 in FIG. 1. As illustrated in FIG. 3, the display module 10 includes a data driving circuit 11, a scan driving circuit 12, a display panel 13, and a display control circuit 14.

Multiple scan lines S1 to Sn which extend in a first direction F1 and multiple data lines D1 to Dm which extend in a second direction F2 are arranged in a grid inside the display panel 13. The first direction F1 is perpendicular to the second direction F2, and the multiple scan lines S1 to Sn, the multiple data lines D1 to Dm, and the scan lines S1 to Sn and the data lines D1 to Dm are insulated from one another.

Pixel units 15 are disposed at intersections of the multiple scan lines S1 to Sn and the data lines D1 to Dm respectively. In implementations, the pixel units 15 can be represented as P11 to P1m, P21 to P2m, . . . , Pn1 to Pnm, respectively. Each pixel unit 15 includes a driving element and the liquid crystal layer 132. The liquid crystal layer 132 is configured to emit a light under driving of the driving element. In implementations, the driving element includes a semiconductor switching element and an energy storage element. The semiconductor switching element may be a Thin Film Transistor (TFT), and the energy storage element may be a capacitor formed by a pixel electrode (unmarked) and a common electrode (unmarked). The scan lines S1 to Sn are coupled with the scan driving circuit 12 and are configured to receive scan signals from the scan driving circuit 12. The data lines D1 to Dm are coupled with the data driving circuit 11 and are configured to receive image data or data signals Data transmitted in forms of grayscale values and convert the image data or the data signals received into corresponding analog voltage values.

Under the control of the scan lines D1 to Dm, the pixel units 15 are configured to receive data voltages corresponding to the grayscale values in the data signals Data provided by the data lines D1 to Dm in a predetermined period of time, and drive the liquid crystal layer 132 to deflect corresponding angles according to the data voltages, such that backlights received are emitted in corresponding brightness according to the corresponding angles deflected, so as to emit lights of the corresponding brightness according to the image data to perform image display.

A display control circuit 14 is configured to receive an original data signal representing image information Dv, a clock signal CLK for synchronization, a horizontal synchronization signal Hsyn, and a vertical synchronization signal Vsyn from an external signal source of the display module 10, and output a gate output control signal Cg for controlling the scan driving circuit 12, a source output control signal Cs for controlling the data driving circuit 11, and an adjusted data signal Data representing the image information. In implementations, the display control circuit 14 is configured to perform data adjustment on the original data signal to obtain the adjusted data signal Data, and transmit the adjusted data signal Data to the data driving circuit 11.

The scan driving circuit 12 is configured to receive the gate output control signal Cg output by the display control circuit 14 and output a scan signal to each of the scan lines S1 to Sn. The data driving circuit 11 is configured to receive the source output control signal Cs output by the display control circuit 14 and output a data signal Data to each of the data lines D1 to Dm, and the data signal Data is used for image display performed by the driving element in each pixel unit 15 of the display panel 13. The data signal Data provided to the display panel 13 is a data voltage of an analog signal. The scan driving circuit 12 can output scan signals and the data driving circuit 11 can output image signals, such that voltages corresponding to data signals for driving can be applied to driving elements in the pixel units 15 to drive liquid crystal molecules to perform image display.

Figure 4:
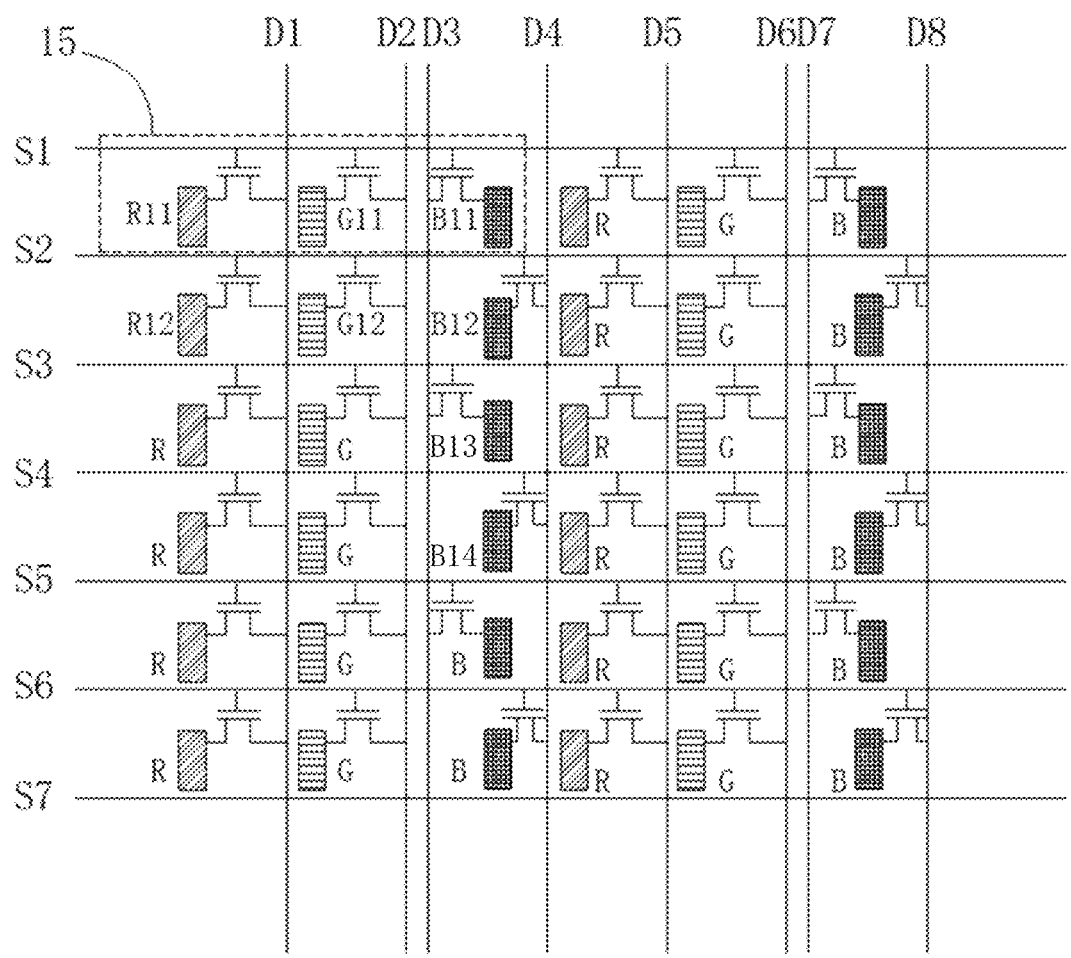
FIG. 4 is a schematic structural diagram of a display panel provided in some implementations of the present disclosure.

Reference can be made to FIG. 4, which is a schematic structural diagram of a display panel provided in some implementations of the present disclosure. As illustrated in FIG. 4, the display panel 13 includes multiple scan lines S1 to Sn which extend in a first direction F1 and multiple data lines D1 to Dm which extend in a second direction F2. The multiple scan lines S1 to Sn, the multiple data lines D1 to Dm, and the scan lines S1 to Sn and the data lines D1 to Dm are insulated from one another.

Sub-pixels are disposed at intersections of the multiple scan lines S1 to Sn and the data lines D1 to Dm respectively, and multiple sub-pixels constitute one pixel unit 15. Multiple pixel units 15 are arranged in an array. Each of the multiple pixel units 15 includes three sub-pixels, is coupled with four data lines, and receives data signals through the four data lines. The three sub-pixels are configured to emit lights corresponding to three primary colors respectively, that is, a first-color sub-pixel R is configured to emit a red light (i.e., a red sub-pixel), a second-color sub-pixel B is configured to emit a green light (i.e., a green sub-pixel), and a third-color sub-pixel B is configured to emit a blue light (i.e., a blue sub-pixel). For example, a pixel unit P11 (FIG. 3) includes a first-color sub-pixel R11, a second-color sub-pixel G11, and a third-color sub-pixel B11.

In multi-column sub-pixels, first-color sub-pixels R in the same column are provided with image display data through one data line, that is, multiple first-color sub-pixels R share the same data line and the data signal provided by the same data line to emit lights of the same color.

Second-color sub-pixels G in the same column are provided with image display data through one data line, that is, multiple second-color sub-pixels G share the same data line and the data signal provided by the same data line to emit lights of the same color.

Third-color sub-pixels B in the same column are provided with image display data through two data lines to emit lights of the same color. Specifically, in the column where the third-color sub-pixels B are located, any two adjacent third-color sub-pixels are coupled with two data lines respectively and receives the data signal provided by the two data lines respectively.

For example, a third data line D3 and a fourth data line D4 are configured to provide image display data for third-color sub-pixels B in a third column. The third data line D3 is configured to provide image display data for a first third-color sub-pixel B11 in the third column, the fourth data line D4 is configured to provide image display data for a second third-color sub-pixel B12 in the third column, the third data line D3 is configured to provide the image display data for a third third-color sub-pixel B13 in the third column, and the fourth data line D4 is configured to provide the image display data for a fourth third-color sub-pixel B14 in the third column, such that the third data line D3 and the fourth data line D4 can alternately provide the third-color sub-pixels B in the third column with image display data by turns. Alternatively, the fourth data line D4 is configured to provide the image display data for the first third-color sub-pixel B11 in the third column, and the third data line D3 is configured to provide the image display data for the second third-color sub-pixel B12 in the third column alternately. By using two data lines to provide the image display data for the third-color sub-pixels B in the same column by turns, a charging rate of each third-color sub-pixel B can be improved.

A specific scan process includes follows. When a scan line S1 in a first row is at high level, TFTs corresponding to sub-pixels in the first row are turned on, and the data lines D1 to Dm are configured to provide image display data for the sub-pixels in the first row respectively. For the sub-pixels in the first row, one data line corresponds to a first-color sub-pixel R and is configured to provide image display data for the first-color sub-pixel R, one data line corresponds to a second-color sub-pixel G and is configured to provide image display data for the second-color sub-pixel G, and one of the two data lines which is coupled with a present third-color sub-pixel B is configured to provide image display data for the third-color sub-pixel B, until all pixel units 15 in the first row are charged.

When a scan line S2 in a second row is at high level, TFTs corresponding to sub-pixels in the second row are turned on, and the data lines D1 to Dm are configured to provide the image display data for the sub-pixels in the second row respectively. For the sub-pixels in the second row, one data line corresponds to a first-color sub-pixel R and is configured to provide the image display data for the first-color sub-pixel R, one data line corresponds to second-color sub-pixel G and is configured to provide the image display data for the second-color sub-pixel G, and one of the two data lines which is coupled with a present third-color sub-pixel B is configured to provide the image display data for the third-color sub-pixel B, that is, one of the two data lines which is not coupled with the third-color sub-pixel B in the first row in the same column is configured to provide the image display data for the present third-color sub-pixel B, until all pixel units 15 in the second row are charged.

When a scan line Sn in a n-th row is at high level, TFTs corresponding to sub-pixels in the n-th row are turned on, and the data lines D1 to Dm are configured to provide the image display data for the sub-pixels in the n-th row respectively, until all pixel units 15 in the n-th row are charged. In this case, one frame of picture is displayed.

Figure 5:
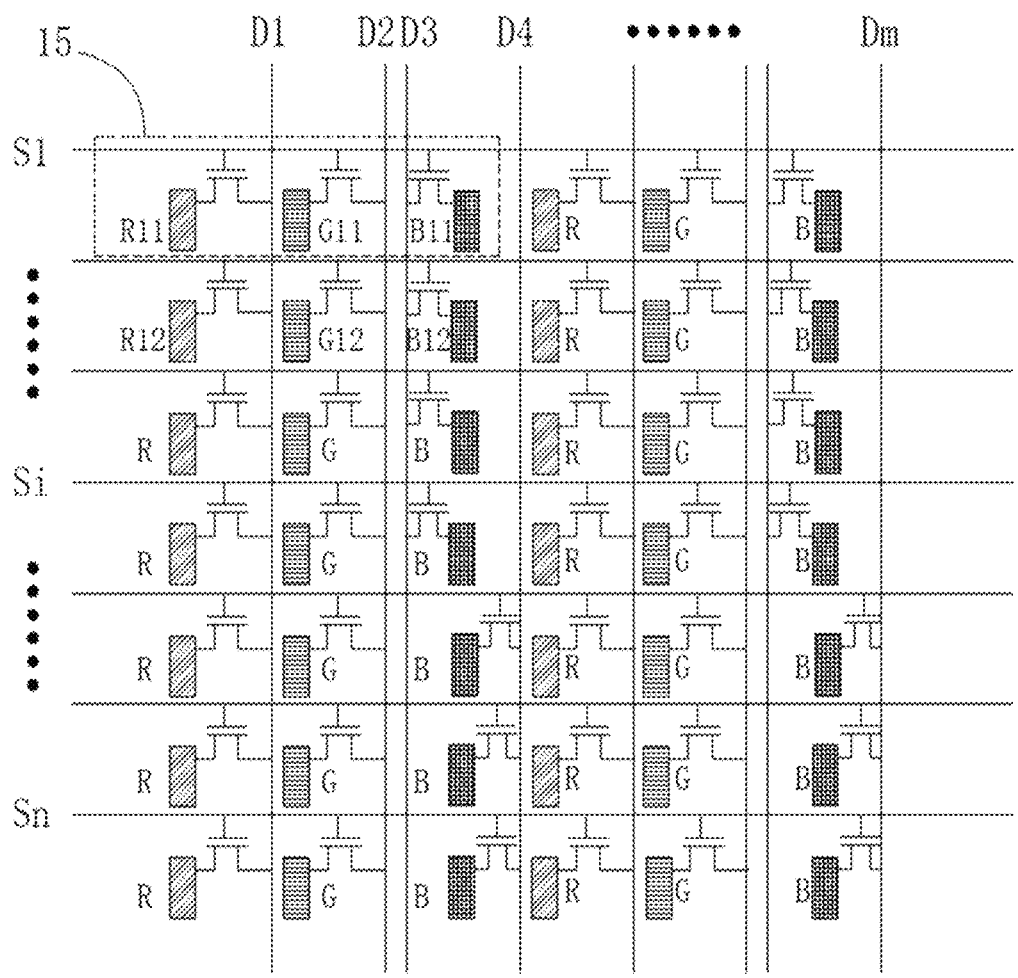
FIG. 5 is another schematic structural diagram of the display panel in FIG. 4.

Reference can be made to FIG. 5, which is another schematic structural diagram of the display panel in FIG. 4. As illustrated in FIG. 5, the third-color sub-pixels B may also be coupled with two data lines to receive data signals in other manners. For example, in third-color sub-pixels B in the same column, a first third-color sub-pixel B1 to an i-th third-color sub-pixel Bi are coupled with one of the two data lines, and the image display data is received through the same data line, that is, third-color sub-pixels B corresponding to scan lines S1 to S1 are provided with the image display data though the same one of the two data lines. An (i+1)-th third-color sub-pixel Bi+1 to the n-th third-color sub-pixel Bn are coupled with the other one of the two data lines, and the image display data is received through the other one of the two data lines, that is, third-color sub-pixels B corresponding to scan line Si+1 to Sn are provided with the image display data through the other one of the two data lines.

The third-color sub-pixels B in one column are coupled with the two data lines to receive the data signal, while the first-color sub-pixels R in one column and the second-color sub-pixels G in one column each are coupled with one data line to receive the data signal, so resistive-capacitive (RC) loading of a data line corresponding to a third-color sub-pixel B is less than each of RC loading of a data line corresponding to the first-color sub-pixel R and RC loading of a data line corresponding to the second-color sub-pixel G, such that the charging rate of the third-color sub-pixel B is higher than each of the charging rate of the second-color sub-pixel G and the charging rate of the first-color sub-pixel R, and the brightness of the third-color sub-pixel B is improved, which effectively solves a problem of yellowish display of a liquid crystal display (LCD) due to low brightness of the third-color sub-pixel B.

Figure 6:
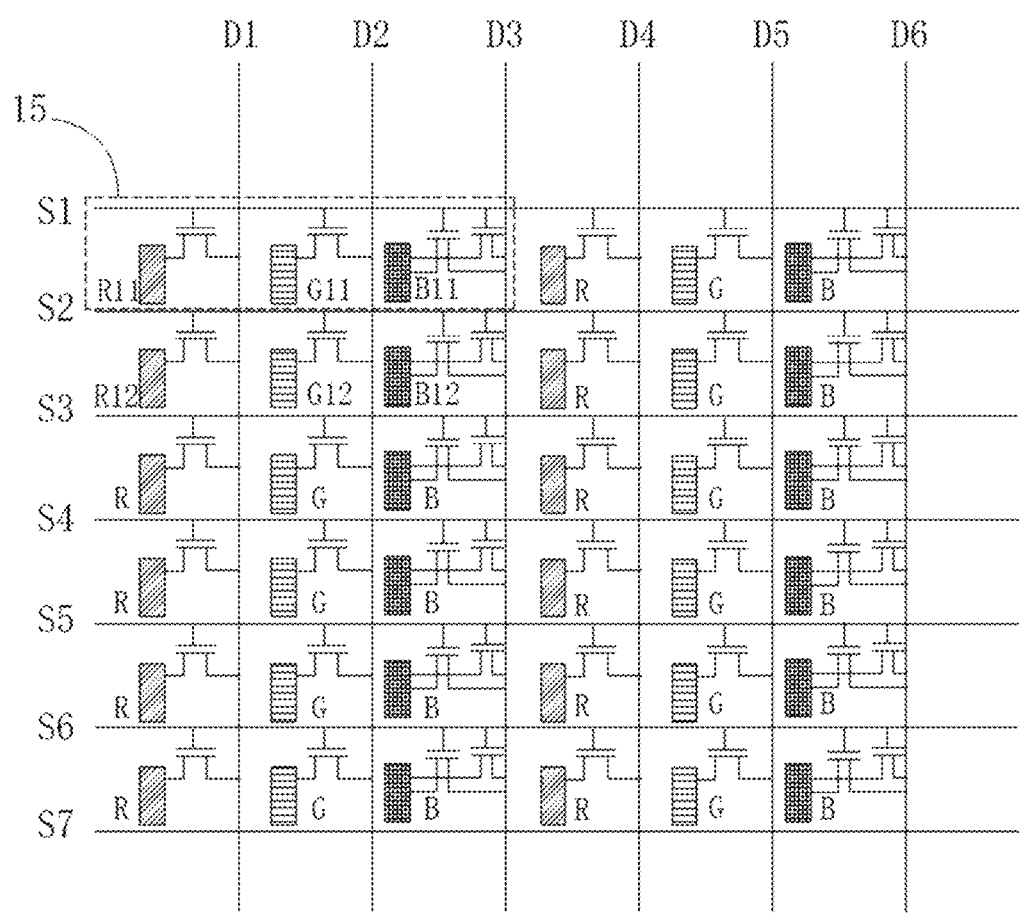
FIG. 6 is a schematic structural diagram of a display panel provided in other implementations of the present disclosure.

Reference can be made to FIG. 6, which is a schematic structural diagram of a display panel provided in other implementations of the present disclosure. As illustrated in FIG. 6, the display panel 13 includes multiple scan lines S1 to Sn which extend in the first direction F1 and multiple data lines D1 to Dm which extend in the second direction F2. The multiple scan lines S1 to Sn, the multiple data lines D1 to Dm, and the scan lines S1 to Sn and the data lines D1 to Dm are insulated from one another.

Sub-pixels are disposed at intersections of the multiple scan lines S1 to Sn and the data lines D1 to Dm respectively, and multiple sub-pixels constitute one pixel unit 15. Multiple pixel units 15 are arranged in an array, and each of the multiple pixel units 15 includes three sub-pixels and is coupled with three data lines. The three sub-pixels are configured to emit lights corresponding to three primary colors respectively, that is, a first-color sub-pixel R is configured to emit a red light, a second-color sub-pixel B is configured to emit a green light, and a third-color sub-pixel B is configured to emit a blue light.

In any pixel unit 15, a first-color sub-pixel R is coupled with one data line through one TFT to receive a data signal to emit a red light, a second-color sub-pixel R is coupled with one TFT to receive a data signal to emit a green light, and a third-color sub-pixel B is coupled with one data line through two TFTs to receive a data signal to emit a blue light. The two TFTs are located between the third-color sub-pixel B and the data line.

Specifically, when the scan line S1 in the first row is at high level, TFTs corresponding to the sub-pixels in the first row are turned on, and the data lines D1 to Dm are configured to provide image display data for the sub-pixels in the first row respectively. Among the sub-pixels in the first row, any third-color sub-pixel B is coupled with the same data line through two TFTs, and a rate of receiving the data signal by the third-color sub-pixel B is controlled by the two TFTs. For example, the first third-color sub-pixel B11 among the sub-pixels in the third column is configured to receive the data signal under the control of two TFTs.

When the scan line S2 in the second row is at high level, TFTs corresponding to the sub-pixels in the second row are turned on, and the data lines D1 to Dm are configured to provide image display data for the sub-pixels in the second row respectively. Among the sub-pixels in the second row, any third-color sub-pixel B is coupled with the same data line through two TFTs, and a rate of receiving the data signal by the third-color sub-pixel B is controlled by the two TFTs. For example, the second third-color sub-pixel B11 among the sub-pixels in the third column is configured to receive the data signal under the control of two TFTs. And so on, until the sub-pixels in the n-th row are charged, the display panel 13 displays one frame of complete image.

Any third-color sub-pixel B is coupled with the same data line through the two TFTs, such that the third-color sub-pixel B can receive the data signal provided by the data line through have two interfaces at the same time, thereby improving the receiving efficiency of the third-color sub-pixel B, that is, improving the charging efficiency of the third-color sub-pixel B. Compared with the first-color sub-pixel R and the second-color sub-pixel G each controlled by only one TFT, the third-color sub-pixel B has a higher charging rate, such that in the same pixel unit 15, the blue light emitted by the third-color sub-pixel B is brighter than the red light emitted by the first-color sub-pixel R and the green light emitted by the second-color sub-pixel G. For each pixel unit 15 in the display panel 13, the brightness of the blue light emitted by the third-color sub-pixel B is improved by this method, which effectively solves the problem of the yellowish display of the LCD due to the low brightness of the third-color sub-pixel B.

Figure 7:
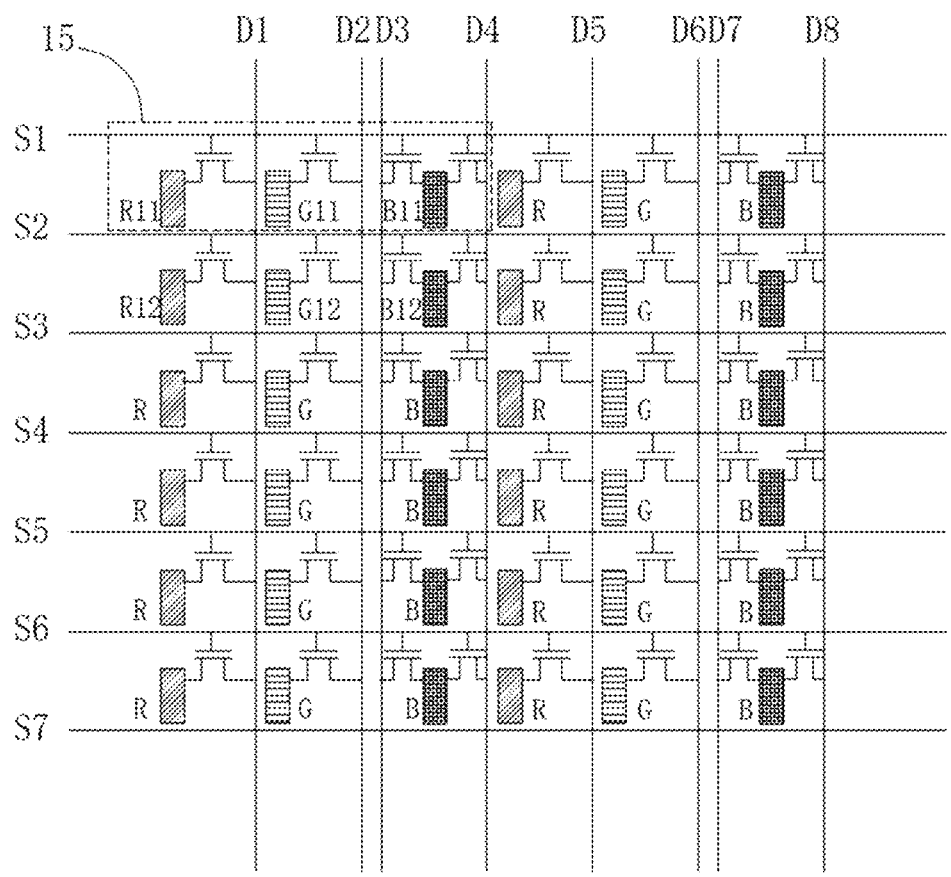
FIG. 7 is a schematic structural diagram of a display panel provided in other implementations of the present disclosure.

Reference can be made to FIG. 7, which is a schematic structural diagram of a display panel provided in other implementations of the present disclosure. As illustrated in FIG. 7, the display panel 13 includes multiple scan lines S1 to Sn which extend in the first direction F1 and multiple data lines D1 to Dm which extend in the second direction F2. The multiple scan lines S1 to Sn, the multiple data lines D1 to Dm, and the scan lines S1 to Sn and the data lines D1 to Dm are insulated from one another.

Sub-pixels are disposed at intersections of the multiple scan lines S1 to Sn and the data lines D1 to Dm respectively, and multiple sub-pixels constitute one pixel unit 15. Multiple pixel units 15 are arranged in an array, and each of the multiple pixel units 15 includes three sub-pixels and is coupled with four data lines. The three sub-pixels are configured to emit lights corresponding to three primary colors respectively, that is, a first-color sub-pixel R is configured to emit a red light, a second-color sub-pixel B is configured to emit a green light, and a third-color sub-pixel B is configured to emit a blue light.

In multi-column sub-pixels, first-color sub-pixels R in the same column are provided with the image display data through one data line, that is, the multiple sub-pixels share one data line and the data signal provided by the data line. Second-color sub-pixels G in the same column are provided with the image display data through one data line, that is, the multiple sub-pixels share one data line and the data signal provided by the data line. Third-color sub-pixels B in the same column are provided with the image display data through two data lines.

Specifically, in any pixel unit 15, the first-color sub-pixel R is coupled with one data line through one TFT, and the data line is configured to control the first-color sub-pixel R to receive the data signal to emit the red light. The second-color sub-pixel R is coupled with one data line through one TFT, and the data line is configured to control the second-color sub-pixel G to receive the data signal to emit the green light. The third-color sub-pixel B is coupled with two data lines through two TFTs respectively, and the two data lines are configured to control the third-color sub-pixel B to receive the data signal to emit the blue light.

For example, the data line D3 and the data line D4 each are coupled with the sub-pixels in the third column to provide the image display data for the sub-pixels in the third column. The data line D3 is coupled with the first third-color sub-pixel B11 through one TFT, and the data line D4 is coupled with the first third-color sub-pixel B11 through another TFT, that is, one third-color sub-pixel B11 is configured to receive a data voltage from two data lines through two TFTs at the same time. The two data lines coupled with the third-color sub-pixel B may be located at two sides of the third-color sub-pixel B, or at one side of the third-color sub-pixel B at the same time, which is not limited in the present disclosure. When the two data lines are located at the two sides of the third-color sub-pixel, the two TFTs coupled with the two data lines are also located at the two sides of the third-color sub-pixel B.

A specific scan process includes follows. When the scan line S1 in the first row is at high level, TFTs corresponding to sub-pixels in the first row are turned on, and the data lines D1 to Dm are configured to provide image display data for the sub-pixels in the first row respectively. For the sub-pixels in the first row, one data line corresponds to a first-color sub-pixel R and is configured to provide image display data for the first-color sub-pixel R, one data line corresponds to a second-color sub-pixel G and is configured to provide image display data for the second-color sub-pixel G, and any one of the two data lines coupled with a present third-color sub-pixel B may be configured to provide image display data for the third-color sub-pixel B through an independent TFT, or the two data lines are configured to simultaneously provide the image display data for the present third-color sub-pixel through two independent TFTs, until all pixel units 15 in the first row are charged.

When the scan line S2 in the second row is at high level, TFT corresponding to sub-pixels in the second row are turned on, and the data lines D1 to Dm are configured to provide the image display data for the sub-pixels in the second row respectively. In the sub-pixels in the second row, one data line corresponding to a first-color sub-pixel R is configured to provide the image display data for the first-color sub-pixel R, one data line corresponding to second-color sub-pixel G is configured to provide the image display data for the second-color sub-pixel G, and any one of the two data lines is configured to provide the image display data for a present third-color sub-pixel B through an independent TFT, or the two data lines are configured to simultaneously provide the image display data for the present third-color sub-pixel B through two independent TFTs.

When a scan line Sn in a n-th row is at high level, TFTs corresponding to sub-pixels in the n-th row are turned on, and the data lines D1 to Dm are configured to provide the image display data for the sub-pixels in the n-th row respectively, until all pixel units 15 in the n-th row are charged. In this case, one frame of picture is displayed.

In each pixel unit 15 in the array, the two data lines coupled with the third-color sub-pixels B are controlled by the data driving circuit 11, such that one of the two data lines performs normal data transmission and the other of the two data lines is in an off state. When the display panel 13 feeds back that the brightness of the blue light emitted by the third-color sub-pixel B is lower than a first threshold, the brightness of the blue light emitted by third-color sub-pixel B is lower than each of the brightness of the light emitted by the first-color sub-pixel R and the brightness of the light emitted by the second-color sub-pixel G, and a color shift phenomenon may occur to the display panel 13. The data driving circuit 11 can control the data line in the off state to be turned on, and the third-color sub-pixel B is provided with the image display data through the TFT coupled with the data line.

The RC loading of the data line corresponding to the third-color sub-pixel B controlled by the two data lines and the two TFTs is far less than each of the RC loading of the data line corresponding to the first-color sub-pixel R and the RC loading of the data line corresponding to the second-color sub-pixel G, such that the charging rate of the third-color sub-pixel B is higher than each of the charging rate of the first-color sub-pixel and the charging rate of the second-color sub-pixel, and the brightness of the third-color sub-pixel B is improved, which effectively solves the problem of the yellowish display of the LCD due to low brightness of the third-color sub-pixel B.

It should be understood that application of the present disclosure is not limited to the above examples. For those of ordinary skill in the art, improvements or changes can be made according to the above description, and these improvements and changes all fall within the protection scope of the appended claims of the present disclosure.

What is claimed is:

1. A display panel, comprising:
a plurality of scan lines arranged in a first direction;
a plurality of data lines arranged in a second direction, the second direction being perpendicular to the first direction; and
a plurality of pixel units arranged in an array, wherein each of the plurality of pixel units comprises a red sub-pixel, a green sub-pixel, and a blue sub-pixel, a plurality of sub-pixels are arranged in rows in the first direction, sub-pixels in each of the rows are coupled with one of the plurality of scan lines to receive a scan signal, sub-pixels which emit lights of a same color are arranged in columns in the second direction, and sub-pixels in each of the columns are coupled with at least one of the plurality of data lines to receive image display data; wherein
the blue sub-pixel has a charging rate higher than each of the red sub-pixel and the green sub-pixel, in any pixel unit of the array;
a plurality of blue sub-pixels in any column are coupled with two data lines, to receive the image display data from the two data lines when the plurality of blue sub-pixels are started by the scan signal; and
the plurality of blue sub-pixels in any column comprises a first blue sub-pixel to a n-th blue sub-pixel which are arranged in sequence, wherein the first blue sub-pixel to an i-th blue sub-pixel are coupled with one of the two data lines, and an (i+1)-th blue sub-pixel to the n-th blue sub-pixel are coupled with another of the two data lines, i being greater than 1.

2. A display module, comprising:
a display panel comprising:
- a plurality of scan lines arranged in a first direction;
- a plurality of data lines arranged in a second direction, the second direction being perpendicular to the first direction; and
- a plurality of pixel units arranged in an array, wherein each of the plurality of pixel units comprises a red sub-pixel, a green sub-pixel, and a blue sub-pixel, a plurality of sub-pixels are arranged in rows in the first direction, sub-pixels in each of the rows are coupled with one of the plurality of scan lines to receive a scan signal, sub-pixels which emit lights of a same color are arranged in columns in the second direction, and sub-pixels in each of the columns are coupled with at least one of the plurality of data lines to receive image display data; wherein
  the blue sub-pixel has a charging rate higher than each of the red sub-pixel and the green sub-pixel, in any pixel unit of the array;
  a plurality of blue sub-pixels in any column are coupled with two data lines, to receive the image display data from the two data lines when the plurality of blue sub-pixels are started by the scan signal; and
  the plurality of blue sub-pixels in any column comprises a first blue sub-pixel to a n-th blue sub-pixel which are arranged in sequence, wherein the first blue sub-pixel to an i-th blue sub-pixel are coupled with one of the two data lines, and an (i+1)-th blue sub-pixel to the n-th blue sub-pixel are coupled with another of the two data lines, i being greater than 1; and
a backlight module, wherein the backlight module is configured to provide the display panel with a light for display, and the display panel is configured to emit a corresponding light according to image data to-be-displayed to perform image display.

3. A display device, comprising:
a display module, comprising:
  a display panel comprising:
    a plurality of scan lines arranged in a first direction;
    a plurality of data lines arranged in a second direction, the second direction being perpendicular to the first direction; and
    a plurality of pixel units arranged in an array, wherein each of the plurality of pixel units comprises a red sub-pixel, a green sub-pixel, and a blue sub-pixel, a plurality of sub-pixels are arranged in rows in the first direction, sub-pixels in each of the rows are coupled with one of the plurality of scan lines to receive a scan signal, sub-pixels which emit lights of a same color are arranged in columns in the second direction, and sub-pixels in each of the columns are coupled with at least one of the plurality of data lines to receive image display data; wherein
      the blue sub-pixel has a charging rate higher than each of the red sub-pixel and the green sub-pixel, in any pixel unit of the array;
      a plurality of blue sub-pixels in any column are coupled with two data lines, to receive the image display data from the two data lines when the plurality of blue sub-pixels are started by the scan signal; and
      the plurality of blue sub-pixels in any column comprises a first blue sub-pixel to a n-th blue sub-pixel which are arranged in sequence, wherein the first blue sub-pixel to an i-th blue sub-pixel are coupled with one of the two data lines, and an (i+1)-th blue sub-pixel to the n-th blue sub-pixel are coupled with another of the two data lines, i being greater than 1; and
  a backlight module, wherein the backlight module is configured to provide the display panel with a light for display, and the display panel is configured to emit a corresponding light according to image data to-be-displayed to perform image display;
a support frame; and
a power supply module, wherein
the power module is configured to provide the display module for image display with a power voltage, and the display module and the power module are fixed to the support frame.

* * * * *